United States Patent [19]
Mayo

[11] Patent Number: 4,792,946
[45] Date of Patent: Dec. 20, 1988

[54] WIRELESS LOCAL AREA NETWORK FOR USE IN NEIGHBORHOODS

[75] Inventor: Scott T. Mayo, Raleigh, N.C.

[73] Assignee: Spectrum Electronics, Inc., Raleigh, N.C.

[21] Appl. No.: 35,447

[22] Filed: Apr. 7, 1987

[51] Int. Cl.[4] .............................................. H04J 3/02
[52] U.S. Cl. ...................................... 370/86; 370/85
[58] Field of Search ...................... 370/94, 95, 86, 85, 370/88; 455/33, 56; 340/825.05

[56] References Cited

U.S. PATENT DOCUMENTS

| | | | |
|---|---|---|---|
| 4,527,270 | 7/1985 | Sweeton | 370/16 |
| 4,639,914 | 1/1987 | Winters | 455/33 |
| 4,665,519 | 5/1987 | Kirchner et al. | 370/94 |

*Primary Examiner*—Douglas W. Olms
*Assistant Examiner*—Wellington Chin
*Attorney, Agent, or Firm*—Bell, Seltzer, Park & Gibson

[57] ABSTRACT

A local area network for digital information transmission to and from each of a plurality of building units in an area, such as homes in a neighborhood is provided, wherein all connections between units are wireless. Each unit is provided with and fm transceiver station, which is connected with an electrical system in said unit, such as a security system or a power distribution system in such a way that information can be gathered from said system and commands delivered to said system. Each transceiver is adapted to operate at a power level and on a frequency which does not require an FCC license. Each transceiver includes programmable means adapted to cause said transceiver to recognize transmission specifically addressed to it by other stations in the network, and to cause said transceiver to generate and send transmissions specifically addressed to other transceivers in the network. Thus, the transceivers on the network are serially linked in a loop, and commands for the system in any building unit and data from any system in any building unit may be passed from unit to unit about the loop in either of two directions.

23 Claims, 3 Drawing Sheets

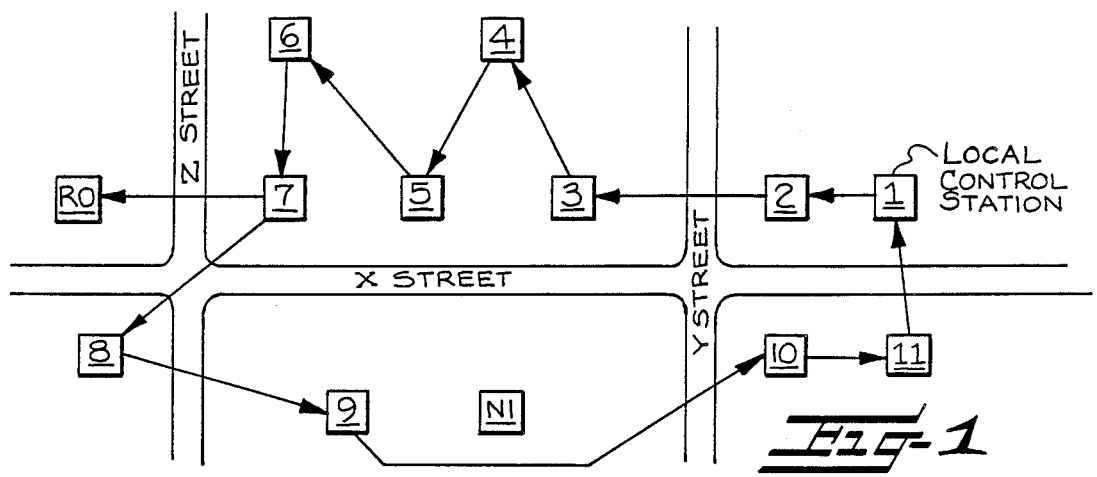
FIG-1
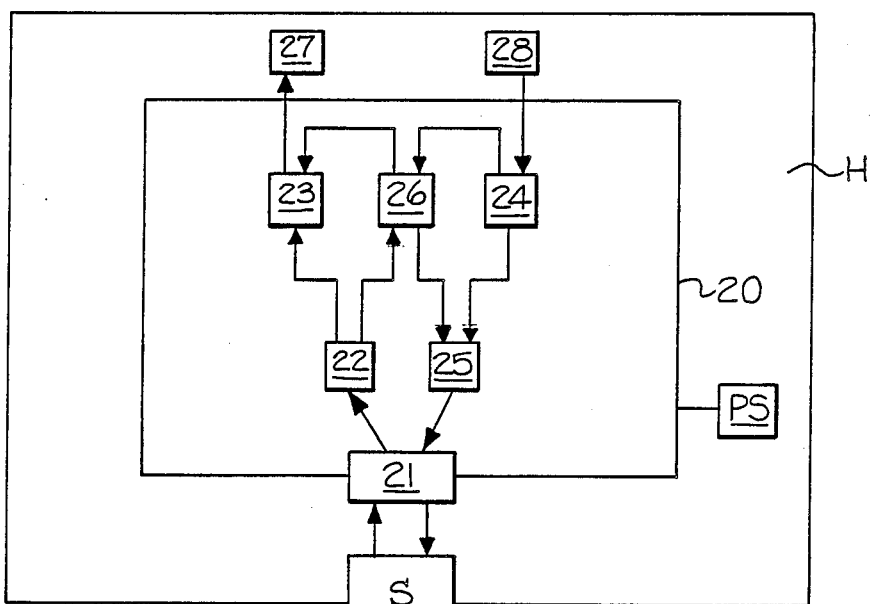
FIG-2
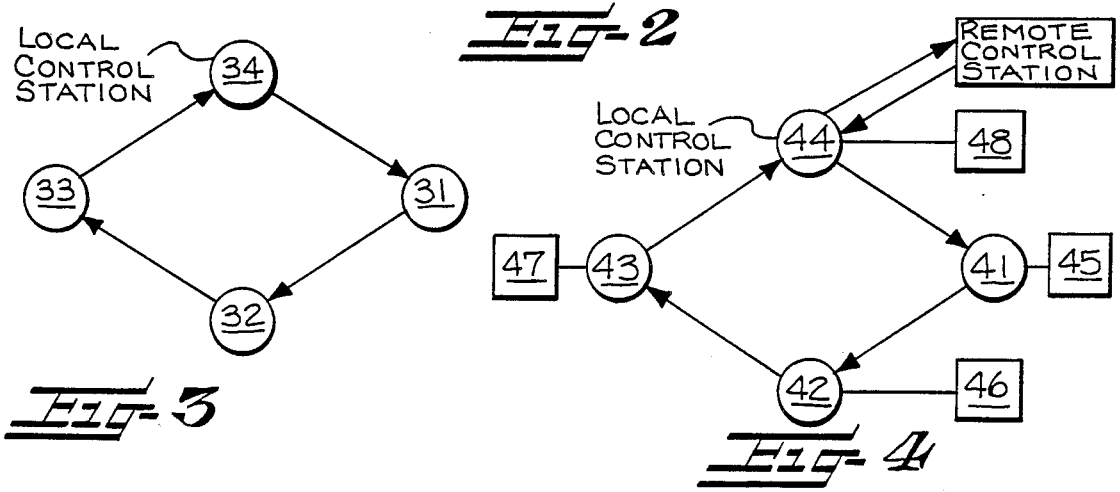
FIG-3
FIG-4

WIRELESS LOCAL AREA NETWORK FOR USE IN NEIGHBORHOODS

FIELD OF THE INVENTION

This invention relates to a low-cost local area network of an exceptionally high level of security and reliability for data transmission to and from the homes in a neighborhood, the offices in a business complex, or the apartments in a high-rise building, for example. More particularly, the invention comprises a network including a plurality of serially-linked, wireless fm transceivers, of a power level and transmission frequency band not requiring an FCC license, one each located in each of a plurality of the homes in a neighborhood, or the like and is comprised of these low power transceivers in a way to cover a much larger area than is possible with standard polling systems. A principal use of said local area network, which preferably incorporates a system for periodically assessing the functional status of each transceiver in the network, is as a neighborhood security system capable of recognizing and acting upon a breach in the security of any home in the network, whether by fire, for example, or by reason of a break-in. Other uses include public-utility-related functions, such as kilowatt-hour usage data transmissions or load-control command transmissions, and other unusual event cognizance such as, for example, that related to the health of residents in a retirement community. Each transceiver is adapted to communicatively interface with a variety of home security systems, or other locally-installed electronic systems such as power meter wheel revolution counters or the like.

BACKGROUND OF THE INVENTION

In general, local area networks interconnect via cables. Such cables are, however, expensive to install even in high-density office buildings, and would be even more expensive in low-density neighborhoods. They are also subject to physical disruption.

Turning now to available home security systems, many provide only a local action in response to a breach of security, such as by turning on an alarm or turning on the lights. If no one is home, and no neighbor notices, such local action is relatively ineffective. Others provide for transmission of information concerning a security breach to some central station via the telephone lines connected to the home the security of which has been breached. However, such land lines are subject to disruption, via deliberate cutting or weather-felled trees, for example. Two-way, long-distance radios can, of course, be used to act upon breaches. However, such radios are expensive, require an FCC license, and almost invariably utilize a radio channel shared by an indefinitely arge number of parties.

The neighborhood security network provided by the invention serves to supply local alarms in more than one home for any breach in a given home, and thus need not report to a central station. Where optionally arranged to so report, it is adapted to make available all the phone lines connected to the homes in the network to report a breach in any given home. It may also utilize but a single two-way long-distance fm transceiver to report to a central station a breach in any given home, thus spreading the cost of such transceiver among all the homes in the network, and minimizing potential licensing difficulties.

Turning next to public-utility-related usage, utility-originated commands for home load control are now typically transmitted over either phone lines or power lines. Both are slow. Further, both are subject to physical disruption, and both present the possibility of spurious signals, or cross-talk, or the like. Occasionally, expensive one-way UHF radios are used, and, of course, even more expensive two-way radios requiring licenses could also be used.

With regard to power usage, on the other hand, electric and gas meters are normally read by human eye by a reader actually visiting the meter. In recent years, a number of schemes have been contemplated to accumulate usage data, as by counting wheel revolutions per unit time and storing such information as a preliminary necessity for actually automatically transmitting such information upon command of a remote central station. Such could be done via power or phone lines, with the same above-mentioned potential problems. Similarly, an expensive two-way long-distance radio would be supplied to each home, though a license would still be required.

The neighborhood network of the invention can readily serve both purposes, with communication with a remote central station provided by a single, licensed transceiver per neighborhood, the cost of which is shared among up to sixteen homss. Outbound power usage data or inbound load control commands can be passed respectively from or to individual homes via the serially linked lower power, license-free FM transceivers in each home.

SUMMARY OF THE INVENTION

The present invention provides a local area network for digital information transmission to and from each of a plurality of homes in a neighborhood, or a plurality of offices in a complex, which network is wireless, secure, reliable, and relatively modest in cost. As generally contemplated, the network comprises a plurality of transceiver stations, one located at each of the plurality of neighborhood homes.

Each transceiver station includes a radio transmitter means adapted to transmit information in digital form, and a radio receiver means adapted to receive information in digital form. The transmitter means is adapted to selectively address the information it transmits to at least either of two other proximately located transceiver stations from among the plurality, while the receiver means is adapted to specifically recognize informtion transmitted to it from at least either of two other proximately located transceiver stations from among the plurality.

Each transceiver station further includes interface means interconnecting the transceiver with at least one electrical system within the home where such transceiver is located, such interface means being adapted to accept data from the electrical system and deliver commands to the electrical system. First means interposed between the interface means and the transmitter modulatingly conveys said data from the interface to the transmitter, while second means interposed between the interface and the receiver demodulatingly conveys said commands from the receiver to the interface.

Still further, each transceiver station also includes programmable control means adapted to cause the transmitter to recognizally and selectively re-transmit data and commands received by the receiver, in a predeterminable manner.

As a result, the plurality of transceiver stations can be serially linked in a loop, and commands for any of said systems and data from any of said systems can be passed from station to station about the loop in either of two directions, such as, for example, in a clockwise or right-hand direction or in a counterclockwise or left-hand direction.

In one embodiment, a local area neighborhood security network, the electrical system located in each of the plurality of homes in the network is an individual home security system for detecting fires or break-ins or the like. Such system is connected via the interface means to the transceiver station, and the data from said system which is modulatingly conveyed by the first means interposed to the transmitter is information concerning alarm conditions. Likewise, the commands demodulatingly conveyed by the second means interposed from the receiver to the interface are alarm termination commands. Preferably, each transceiver station further includes indicator means adapted to recognizably and selectively indicate the existence of an alarm condition in the security system of any of the other homes of the plurality. In this way, an alarm condition in any of the home security systems of the plurality of homes can be selectively and recognizably indicated in at least one other of said plurality of homes.

In another embodiment, a local area utility service network, the electrical system located in each of the plurality of homes in the network is that associated with an individual utility distribution apparatus within such home, such as electric power or natural gas distribution apparatus. Such system is likewise connected via the interface means to the transceiver station, and the data from said system which is modulatingly conveyed by the first means interposed to the transmitter is information concerning utility usage. Similarly, the commands likewise demodulatingly conveyed by the second means interposed from the receiver to the interface are appliance enabling and disenabling commands.

In any embodiment, a predetermined one of the plurality of transceiver stations can be selected to act as a local control station for the network. Such transceiver station further includes means for generating commands addressed to any of the other transceiver stations, and also means for retrievably storing data recognizably received from any of the transceiver stations in the network.

Additionally, or in the alternative, the network can further comprise means interconnecting a remote central station, such as a fire station, for example, or a utility office for further example, with any of said transceiver stations of said plurality. Such means interconnecting are adapted to transmit to the remote central station data from any of the transceiver stations, and are further adapted to receive from the remote central station commands addressed to any of the transceiver stations. Such means interconnecting can be, for example, a suitable telephone line with modems at each end, or, for further example, a long-distance, two-way radio transceiver.

Further still, the local area network of the invention can further comprise verification means for periodically assessing the integrity of the network by ascertaining the operability of each transceiver station therein. Such verification means includes means for generating a status command addressed to a first transceiver station among the serially-linked plurality of stations in the loop. Both said first station and each other station include means directing their respective transmitters to address the status command to the next downstream station in the loop and to re-transmit such command thereto. Also, both the first station and each other station further include means for recognizing when said next downstream station fails to re-transmit the status command and means for generating a fault signal upon recognition of such failure.

Each transceiver other than the first includes means for directing its transmitter to address the fault signal to the next transceiver upstream in the loop and to transmit such signal thereto. Said first transceiver includes means for directing the fault signal back to the means for generating the status command. Such generating means also includes means for recognizing, storing, and acting upon said fault signal.

The means for generating the status command, including the means for recognizing, storing, and acting upon the fault signal, can be located within the local control station, whereupon said first transceiver station is the local control station itself. Alternatively, the means for generating the status command, including the means for recognizing, storing and acting upon the fault signal, can be located in the remote central station, whereupon said first transceiver station is the transceiver station associated with the remote central station via the interconnecting means.

BRIEF DESCRIPTION OF THE DRAWINGS

FIG. 1 is a schematic representation of a neighborhood in which a plurality of homes are included within the local area network of the invention.

FIG. 2 is a schematic representation showing in block diagram form the transceiver station in each home of the plurality.

FIG. 3 is a schematic representation of a simplified version of the local area network of the invention.

FIG. 4 is a schematic representation of a simplified version of the local area network of the invention including means for interconnecting the network with a remote central station.

DETAILED DESCRIPTION OF THE INVENTION

Figure 5:
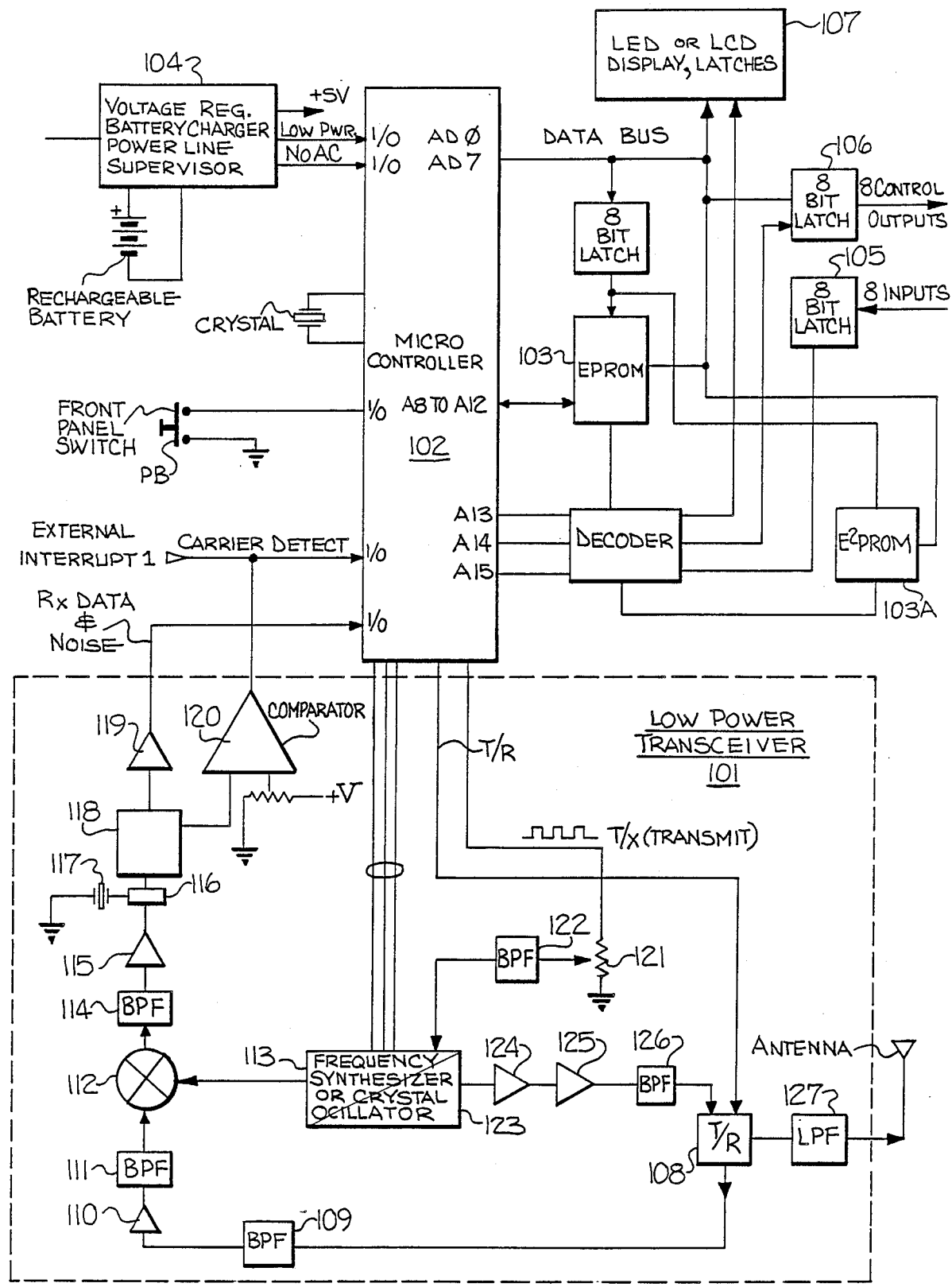
FIG. 5 is a block diagram showing one preferred form of a typical transceiver utilized in the network.

While the present invention will be described more fully hereinafter with reference to the accompanying drawings, in which a preferred embodiment of the present invention is shown, it is to be understood at the outset of the description which follows that persons of skill in the art may modify that which is herein described while still employing the invention as such and achieving the salutary results thereof. Accordingly, the description which follows is to be understood as being a broad, teaching disclosure directed to persons of skill in the appropriate arts, and not as limiting upon the present invention. A general description of the invention will be set forth initially, to be followed by a description of alternative embodiments and optional features, and in turn followed by a more specific description of certain transceiver circuitry.

Referring to FIG. 1 of the drawings, a neighborhood is shown in schematic plan form, including thirteen homes, eleven of which, numbered 1 through 11, are actively included in the local area network. Each home in the network has a transceiver station installed therein. The transceiver station at home 1 has been selected to act as the local control station normally included in the network. The arrowed lines from home to home indicate that the plurality of stations in the network can be serially linked in a loop, with the arrows indicating a direction in which data and commands can be passed about the loop. Such direction can, of course, be of opposite hand.

The home labeled RO is, optionally, associated with a receiver only, such that cognizance can be maintained there of data and commands traveling about the loop. Such could, instead of a home, be, for example, a guard station at the entrance to the neighborhood. Such home does not otherwise participate in the network. The home labeled NI has no transceiver and is not involved in the network to any extent. Naturally, the homes 1 through 11 depicted in FIG. 1 could as easily represent offices in a complex or warehouse units in an industrial park, for example.

Referring to FIG. 2 of the drawings, a schematic representation of one of the transceiver-station-equipped homes in the network is shown. Within home H is installed transceiver station 20, which is connected via interface menns 21 to home electrical system S. System S can be typical individual home security system of any known type, which detects, for example, a fire or a break-in, and develops a signal which sounds an alarm, or turns on the lights, or the like. System S can also be associated with a utility distribution system in home H, capable of, for example, ascertaining and reporting on kilowatt-hour usage, or of turning on or shutting off the air conditioner, for further example.

The arrowed lines between interface 21 and system S indicate the flow of system data to interface 21 from system S, and the flow of commands from interface 21 to system S. It will be readily appreciated that interface 21 can include some combination of suitably arranged wires, switches, connectors, relays and the like, depending upon the actual nature and extent of system S.

Within the transceiver, as indicated by the arrowed lines, data from system S is modulatingly conveyed from interface 21 to transmitter 23 via means 22 interposed between interface 21 and transmitter 23. On the other hand commands are demodulatingly conveyed from receiver 24 to interface 21 via means 25 interposed between receiver 24 and interface 21. Transmitter 23 is, in turn, connected to a transmitting antenna 27, which may be exterior to the home, but which is in the interest of security, preferably located interior to home H, while receiver 24 is connected to a receiving antenna 28, likewise preferably located interior to home H. Transceiver 20 is also connected to a suitable source of power, PS, preferably including backup battery capability.

Each transceiver station further includes programmable means 26 for directing transmitter 23 to addressably re-transmit certain data and commands received by receiver 24, as will be explained more fully hereinafter. When transceiver 20 is the transceiver designated to act as local control station for the network, programmable means 26 will also include means, not shown, for generating other commands, either to the transmitter 23 or to the system S and will further include other means, also not shown, for retrievably storing data either from the system S or from receiver 24, the operation of all of which will be further appreciated by reason of the detailed explanation of the network in operation, as set forth elsewhere hereinbelow.

The transmitter included in each transceiver station in the local area network of the invention is of a power and frequency such that a Federal Communications Commission license is not required, in the interest of both economy and network installation simplicity. Thus, the frequency of operation will be, for example, selected from among permissible bands within the spectrum segment from 100 kilohertz to 1000 megahertz, and the power level will be severely restricted, such that the effective range is generally less than a mile and typically on the order of about 200 to 1000 yards.

Such range should be quite adequate in most neighborhoods to easily include the transceiver stations located proximately either side of any given transceiver station, whether such neighborhood be densely populated as in an apartment building or relatively sparsely populated as in many rural communities. When, however, the distance beteeen homes having stations is greater than the effective range, such as might be the case, for example, with regard to homes 9 and 10 shown in FIG. 1, then it will be necessary to employ a suitably configured and located repeater station, not shown. Naturally, care must be exercised with regard to the security of the power source for, and access to, any such repeater station.

The transmitter included in each transceiver station must also be capable of transmitting information in digital form, and adapted to address such information to either of two proximately located other transceiver stations. Similarly, the receiver included within each transceiver station must also be capable of receiving information in digital form, and be adapted to specifically recognize information specifically addressed to such receiver received from either of two other proximately located transceiver stations within the network.

When, for example, in the interest of reliability, the respective receivers and transmitters are selected so as to operate in frequency modulation mode, the information in data form can be modulatingly impressed upon the carrier of appropriate frequency by means interposed 22 via, for example, frequency shift keying, and can be demodulatingly detected accordingly by means interposed 25, both as shown in FIG. 2.

In a typically contemplated configuration, for example, the data stream respectively transmtttted and received from one station to the next might include a typical preamble, an 8-bit network identifier to avoid interference with adjacent networks plus 2 parity bits, a 4-bit source transceiver identifier and a 4-bit target transceiver identifier plus 2 parity bits, an 8-bit command when indicated plus 2 parity bits, and, when indicated, one or two 8-bit information groups each with 2 parity bits. Naturally, when 4-bit source and target identifier logic is employed, the number of stations in a network is limited to a maximum of 16.

Referring to FIG. 3, which shows for the sake of simplicity in describing the operations thereof a local area network of the invention of only four transceiver stations, serially linked in a loop, such transceivers are numbered 31, 32, 33 and 34. Transceiver 34 has been selected to operate as the network local control station. Connections between the respective transceivers and the systems of interest in each home are not shown.

When pertinent information, such as an alarm condition, for example, is modulatingly conveyed from the home system associated with transceiver station 32 to the transmitter thereof, that transceiver's programmed control means will direct such transmitter to address the transmission of such information to the receiver of transceiver station 33, and to transmit same. Upon receipt of such information at the station 33 receiver, the programmed control means of transceiver station 33 will, in turn, direct the transmitter thereof to address the transmission of the information concerning station 32, such as, for example, that there was an alarm, on to transceiver station 34, and to transmit same.

Optionally, each transceiver station will also include an indicator, which under alarm circumstances at station 32, for example, will announce appropriately at stations 33 and 34 that there is an alarm at station 32. Also, optionally, the programmed control means at station 32 can be made to cause the transmitter at 32 to repeatedly readdress the information concerning station 32 to transceiver station 33, and to re-transmit same a preset number of times in the interests of reliability, whereupon station 33 will likewise pass on the information concerning station 32 to station 34. Of course, each such transmission is of the form of the aforementioned data stream, and is, thus, effectively a short burst of a second or less in duration, depending upon, for example, the frequency shift keying rate.

As aforesaid, transceiver station 34 acts as local control station for the network. When the information regarding station 32, such as an alarm condition, reaches the receiver at station 34, a number of things can happen, depending on the instructions placed in the programmed controller at station 34. Typically, the information concerning station 32 will first of all be retrievably stored for future use. Next, station 34 will then generate a terminate command directed to station 32, and instructing that station to stop transmitting, and via said programmed control means, instruct the transmitter at station 34 to address a transmission of such command to station 31, and transmit same. The programmed control means at station 31 will in turn cause the transmitter there to address a transmission of such command to station 32, and transmit same. Upon receipt of the command by the receiver at station 32, transmissions of that particular information concerning station 32 will cease. However, if the alarm condition at station 32 persists and has not been locally reset, station 32 will retransmit after a predetermined period of time, whereupon it will in turn receive from station 34 via station 31 another terminate command. This cycle can be repeated a predetermined number of times. Likewise, station 34 can be programmed to send a terminate command only after each set of a predetermined number of repeated transmissions from station 32.

At station 32, as at each other station, there can be a first programmed time delay between the occurrence of an alarm condition and transmission of an alarm signal. This delay is to permit the homeowner to reset locally in the case of a false alarm. Optionally, at local oontrol station 34, there can also be placed in the programmed controller there a second predetermined time delay, such that if at station 34, a preselected number of repeated transmissions of the alarm information from station 32 are not received within the set time, then it will be recognized that there is no need to generate and transmit a termination command addressed to station 32. The usual circumstances in this respect will be a false alarm at station 32, recognized on the premises by the homeowner, who resets the system locally, but after expiration of the programmed time delay at station 32 first.

When the local area network shown in FIG. 3 is operating as a utility service network, the operation of the individual transceiver stations will not differ significantly from that described above insofar as passing usage data and specifically addressed commands about the serially linked loop is concerned. There may, however, have to be more data storage capability and more command generation capability in the programmed control means at the local control station 34 than would typically be the case when the network operates as a security network. This is simply because of greater detail required in utllity service networks. For example, such control means would periodically generate and cause to be transmitted a command to station 32 to determine the amount of electric power usage at the individual home system there. After such command had been passed about the loop to station 32, station 32 would obtain from the associated system the reading 2344 kilowatt-hours, for example, and the programmed control means there at station 32 would cause that information to be likewise passed about the loop to local control station 34, where it would be retrievably stored.

In similar fashion, for load control situations where special utility rates are involved, the programmed control means at station 34 can, for example, at certain times of the day generate commands addressed to station 32 to respectively turn off and turn on the central air conditioner located there, and cause them to be passed about the loop to station 32, where such commands would be fed to the individual home system there. Preferably, the system at that home would then provide station 32 with a confirmation signal which the programmed control means at station 32 would cause to be passed about the loop to station 34. Receipt at station 34 of such a confirmation signal can be used to prevent further re-transmission of such appliance enabling or disenabling commands by station 34 to station 32.

The local area network of the invention preferably also includes verification means for periodically assessing the integrity of the network by assessing the operability of each transceiver therein. Verification operations can be understood by again referring to the simplified network shown in FIG. 3. At regular periodic intervals, the programmed control means at local control station 34 will generate a status command and cause the transmitter there to address such command to station 31 and transmit same. Upon receipt at station 31, the programmed control means there will cause the transmitter there to re-address the status command to station 32, and transmit same. In like fashion, if all transceivers are operative, the status command will be passed about the loop back to local control station 34, where it can be repeated, or not, depending upon the level of reliability desired.

However, suppose, for example, that transceiver station 32 is nonoperative, such that it fails to transmit to station 33 the status command which station 31 has addressed and transmitted to station 32. The receiver at station 31 will, of course, receive anything that station 32 transmits, whether addressed to station 31 or to station 33. Thus, instructions must be placed in the programmed control means at station 31 to recognize under status command circumstances when station 32 does transmit the command to station 33, and station 31's receiver also receives same, in which case station 31 need do nothing. Similarly, station 31 must be instructed to recognize when, during a predetermined period of time after its own transmitter sends the status command to station 32, station 31's receiver does not receive the transmission whereby station 32 sends the status command on to station 33.

In that case, station 31's programmed control means must generate a fault signal identified to station 32 and cause its transmitter to address such fault signal to station 34 and transmit same. Alternatively, station 31's programmed control means could instruct its transmitter to repeat the status command transmission to station 32, and then, only upon a double failure of station 32 to send the status command on to station 33, proceed to generate the fault signal and send it back to station 34. Naturally, the control means at each station in the network must be similarly programmed.

At transceiver station 34, the local control station, the programmed control means will, upon receipt from station 31 of the fault signal concerning station 32 preferably cause the station 34 transmitter to re-direct the status command the opposite way about the serially linked loop, addressing its transmission to station 33. Station 33, if operative, will attempt to transmit to station 32. Thereupon, if 32 remains inoperative, and fails to transmit to station 31, station 33 will recognize such failure and generate a fault signal, and send it back to station 34. Upon receipt of such fault signal, thus verified, station 34 will cause same to be retrievably stored, and will also cause same to be displayed. The purpose, of course, of transmitting the status command in both directions is not only to verify that station 32 is nonoperative. It is also to determine whether station 33 is operative or not. Also, optionally, each transceiver can display the status of each other transceiver.

Referring now to FIG. 4, a simplified network is also shown, similar to that in FIG. 3. Transceiver stations 41, 42, 43, and 44 are serially linked in a loop, with station 44 being the local control stations. Taken as such, this network operates just as does the network shown in FIG. 3. However, here two optional added features are also shown.

First, local control station 44 is shown linked with a remote control station. This link would typically be provided by a two-way, long-distance radio, normally of a type requiring an FCC license due to power and range, and the expense of which is shared by all homes in the network. Such remote control station could be located at a fire station, police station, private security headquarters, or offices of a public utility, for example. The purpose relates to both data storage and command generation, both of which can be done at the remote control station and passed on to the local control station for subsequent passage about the loop. The advantages are several. The local control station programmed control means need not be so elaborate, for one, and the data involved can be acted upon with more efficiency, whether it be connected with an alarm condition or with utility usage.

Next, connected with transceiver stations 41 through 44 are, respectively, modems 45 through 48. Each modem is, in turn, connected with the phone line, not shown, available at the home where the respective transceiver station is located. This is a solution intermediate the stand-alone local controller and the radio link to a remote control station.

Commands would still be generated at the local control station. However, information as to, for example, alarm conditions or utility usage, would be passed over the phone lines to a remote station elsewhere—in short, a one-way link. Information on conditions in the system associated with station 42, for example, whether it be an alarm condition or utility linkage, can be passed on for retrievable storage and action via modem 46 at the same location. If that phone line is inoperative or unavailable, the information can be passed about the loop to the first station where a phone line is both operative and available, and sent to the remote station via the modem at that station.

For example, a fire at station 42 can result in alarm condition information being sent out by phone via modem 46, as well as being passed about the loop to the local control station. But if the phone line at station 42 is down, modem 47 and the phone line at station 43 may be pressed into service to send out information on the alarm condition. The advantages, again, are several. Efficiency of data storage and action is achieved without the expense and trouble of a licensed transceiver. However, the slow transmission, possible disruption, and other potential problems with phones must be accepted. Command generation at the local control station also requires a more elaborate controller than is the case with the two-way, long-distance radio link to the remote control station.

Turning now to FIG. 5, the preferred form of circuitry for a typical transceiver station is shown in block diagram form. In addition to the transceiver proper, indicated generally at 101, the station includes as major components a microprocessor unit (MPU) 102, an EPROM 103, and an E$^2$PROM 103A, interconnected via Decoder 103B. One advantage of E$^2$PROM 103A, of course, is that it does not have to be removed to be re-programmed.

The EPROM 103, when properly programmed, contains in its memory all of the instructions required for proper operation of the transceiver station. Included at specifically identifiable addresses are, for example, instructions concerning status commands and instructions concerning terminate commands. Likewise E$^2$PROM 103A, when properly programmed, contains at specific addresses in its memory identification information unique to the network, identification information unique to this particular transceiver, identification information unique to the next proximate downstream transceiver station, and identification information unique to the next proximate upstream transceiver station. A RAM may be substituted for E$^2$PROM 103A, but if so, will require a backup battery to prevent memory loss associated with power outages and the like.

The MPU 102 monitors the status of power supply 104, and also addressably monitors the status of, for example, eight inputs from the security or other system in the home wherein the transceiver station is located via 8-bit latch 105. Further, MPU 102 serves to generate in connection with EPROM 103 commands which it addressably delivers to, for example, eight outputs to said security or other system via 8-bit latch 106. Further still, MPU 102 serves to decode bit streams delivered by the receiver portion of the transceiver proper and serves to encode and deliver bit streams to the transmitter portion of the transceiver proper, all in conjunction with instructions and information programmed into EPROM 103 and E²PROM 103A, respectively. Additionally, MPU 102 also is addressably interconnected with a display unit 107, and with a manually operated switch PB, such as a push button, which can be assigned to a function such as, for example, disenabling alarm transmissions under false alarm circumstances.

The transceiver proper, indicated generally at 101, is, as aforesaid, adapted to operate at frequency and power levels not requiring an FCC license for transmission purposes, and should preferably by designed for maximum sensitivity and range within the applicable FCC restrictions, while still being moderate in cost. It must also meet FCC spurious emission standards when transmitting, while rejecting spurious and unwanted signals when receiving, in order to achieve the desired system reliability and security.

As shown, the transceiver utilizes a single antenna ANT for both reception and transmission, although it will be readily recognized that separate antennas may be utilized, especially when optionally utilizing a split-frequency mode of operation. Here, antenna operation within the circuit is controlled by Transmit-Receive (T/R) Swttch 108, which is in turn controlled by MPU 102. A usual with such switches, as generally known in the art, T/R Switch 108 is in normal operation in receive mode at aall times except when actually carrying out a transmission instruction.

The receiver portion of the transceiver proper is shown as a double conversion receiver. The frequency modulated signal captured by the antenna is directed via the switch 108 through band-pass filter 109, through low-noise amplifier 110, through second band-pass filter 111, to first mixer 112. Mixer 112 converts the signal from one centered about the carrier as captured by antenna ANT to one centered about a lower frequency determined by frequency synthesizer 113 in conjunction with MPU 102, such as, for example, 10.7 MHz.

The signal next proceeds through band-pass filter 114, which limits the bandwidth to, for example, 15 KHz, and thence through amplifier 115 to second mixer 116. Second mixer 116, in conjunction with crystal oscillator 117 converts the signal from one centered about the first intermediate frequency carrier to one centered about a second lower intermediate frequency carrier, such as, for example, 455 KHz.

Next, the signal is demodulated by demodulator 118, via a quadrature detector. The informational signal thus obtained is next passed through limiting amplifier 119 for signal enhancement, whence it is delivered to MPU 102. Demodulator 118 also delivers a dc output proportional to receiver signal strength, which is in essence a carrier detection indicator. The level of this output is compared to a predetermined dc level by comparator 120, and the result is also delivered to MPU 102.

If the output from comparator 120 is sufficient to indicate the presence of a carrier, MPU 102 will examine the informational signal delivered by limiting amplifier 119. First, MPU 102 will determine whether such signal is a bit stream of the proper format for the network. If not, the MPU will return to standby status, essentially a monitoring function. But if so, then MPU 102 looks for a start bit and attempts to decode the first word, typically the network identifier, by comparing same with predetermined information stored in E²-PROM 103A. If such word is not correct for the system, MPU 102 returns to standby status. But if the network identifier is correct, then MPU 102 proceeds to likewise attempt to decode the second word, which typically includes the signal-originating source transceiver identifier.

In similar fashion, MPU 102 proceeds seriatim through the bit stream, going next to the transmission-source-transceiver identifier, the target transceiver identifier, the command word or words, the informational word or words, and so forth. In each instance, MPU 102 compares the word with predetermined words stored in E²PROM 103A. In each instance, a proper match permits progress to the next word, while an improper match returns the MPU to standby status. Notably, in each instance where MPU 102 returns to standby status it will where the signal delivered by comparator 120 still indicates the presence of a carrier, re-attempt to decode the informational signal delivered by limiting amplifier 119.

In decoding a bit sream of proper format delivered by limiting amplifier 119, MPU 102 calculates parity for each word and compares the result with the parity bit or bits included following the word to determine whether the word is error free. If so, the word is internally stored without the parity bits. If not, the decoding attempt is aborted and the MPU returns to standby status. As aforesaid, MPU 102 will re-attempt decoding if a carrier is still present, but will otherwise merely continue monitoring functions, such as with respect to those inputs associated with the home security system, for example.

Turning now to the transmitter portion of the transceiver, the transmission of a bit stream is required upon any of several occasions. For example, a received bit stream may be one that must be re-transmitted to the next transceiver station downstream in the loop. For further example, a received bit stream may contain a commadd requiring the transmission of data concerning the system in the home where the transceiver is located. For still further example, if the home system in question is a security system in alarm condition, then information on that condition must be transmitted, and thus sent on its way around the loop.

In each instance, the appropriate information and commands, together with the target and source identifiers are obtained from EPROM 103 and E²PROM 103A by MPU 102. MPU 102, via an encoder routine also called up from the EPROM 103, appropriately Manchester-phase-encodes all such information into a signal in the form of a bit stream. This signal must be appropriately processed to limit the bandwidth of the eventually resulting modulated carrier. Consequently, MPU 102 delivers the signal to fm deviation control 121, which limits the frequency deviation to 2 to 3 KHz, for example. The signal proceeds, in turn, through band pass filter 122 which diminishes harmonic content in order for the eventually resulting modulated carrier to comply with FCC regulations.

Frequency synthesizer 113 generates a carrier at a frequency determined by MPU 102, and delivers such carrier to modulator portion 123, to which is also delivered the bit stream from band pass filter 122. Modulator 123 proceeds to suitably modulate the carrier with the bit stream, via, for example, a voltage-controlled reactance, such as a varactor diode, whihh permits the modulating signal to shift the oscillator frequency proportional to signal amplitude. The resulting modulated carrier is amplified by amplifiers 124 and 125, and thereafter filtered by band pass filter 126 to suppress spurious signals and harmonics.

Next, the modulated carrier is delivered, via T/R switch 108 and low pass filter 127 to antenna 107. T/R switch 108, has, of course, been switched by MPU 102 from receive mode to transmit mode. Low pass filter 127 acts to further diminish harmonics to an acceptable level in accordance with FCC requirements.

When a transceiver station such as that shown in FIG. 5 is selected to be the one station acting as local control station for the network, no additional or different hardware is needed. Said otherwise, the components and interconnections shown by FIG. 5 remain the same. EPROM 103 will contain additional commands, such as those associated with generating signals for assessing the integrity of the network, as well as a sub-routine which, working in conjunction with an internal clock in MPU I02, will periodically cause appropriate transmission of such commands. Likewise, MPU 102 will have an internal RAM with sufficient capacity to store information received by th local control station from the various transceiver stations in the loop. Naturally, additional storage capacity can be added, if need be, via one or more additional $E^2PROM$ units, not shown, or, alternatively, battery-backed RAM units.

Figure 6A:
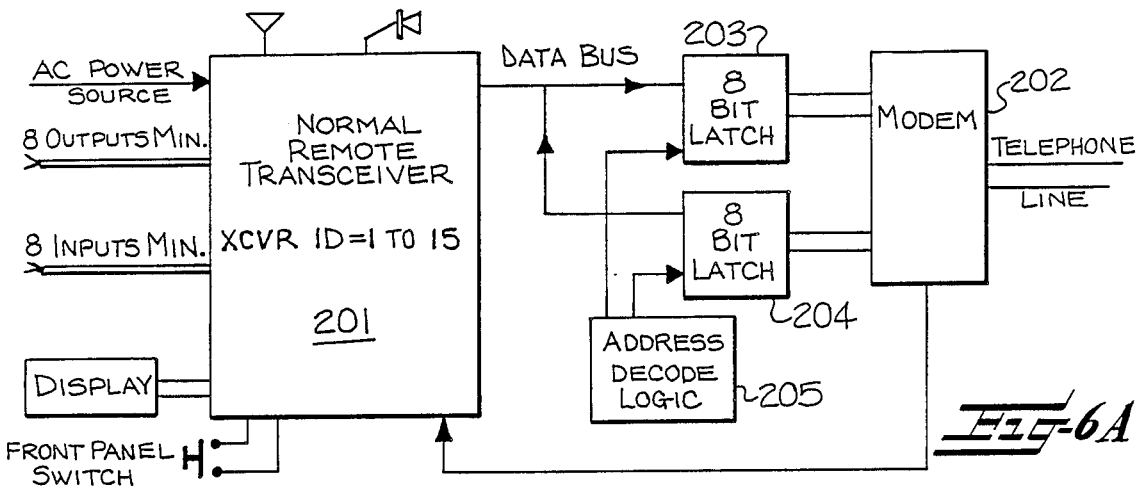
FIG. 6A is a block diagram showing a preferred form of interconnection between a typical transceiver and a phone line.

FIG. 6A shows in block diagram form a typical interconnection between a transceiver station such as shown in FIG. 5 and the telephone line associated with the home where the transceiver station is located, an optional feature. Such station may be the local control station, but need not be, frr the interconnection is the same. Transceiver station 201 contains all of the circuitry shown in FIG. 5 with the outputs, inputs, display, power source, and antenna shown in FIG. 6A all connected as indicated in FIG. 5. A data bus from transceiver station 201 is interconnected with the telephone line via modem 202, and 8-bit latches 203 and 204. Address logic unit 205 is provided to act in conjunction with commands delivered by MPU 102 from EPROM 103, neither of which is shown here, to enable the required information, such as an alarm condition, for example, to be sent via phone toaa predetermined phone number, such as that of the local fire station, for example. It will be recognized that the arrangemen shown in FIG. 6A is in general like that usually utilized, in that it can also receive information by phone line, as well as send out information. While the operation contemplated in connection with the present locll area network is concerned entirely with sending out information, the possibility of receipt by any transceiver station of nnstructions or information via phone line is to be understood as being part of this invention.

Figure 6B:
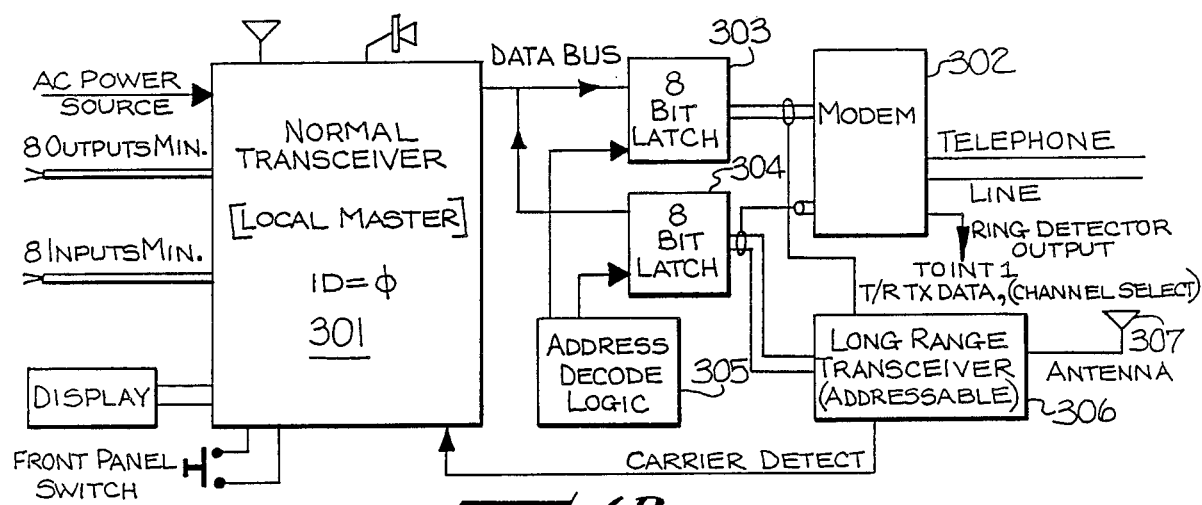
FIG. 6B is a block diagram showing a preferred form of interconnection between a transceiver acting as local control station and both a phone line and a long range transceiver.

FIG. 6B shows a transceiver station as in FIG. 5 which has been selected to operate as local control station, and which is, optionally, provided with both a telephone line interconnection as in FIG. 6A, and, optionally also provided with the capability of two-way communication with a central station via a long-range licensed transceiver. Transceiver station 301 is interconnected with the phone line via modem 302, 8-bit latches 303 and 304 and address logic unit 305, just as shown in FIG. 6A. Long-range transceiver 306 is connected to previously unused I/O lines of latches 303 and 304 which interface it to the data bus from transceiver 301. Typically, a portion of each of the lines in latches 303 and 304 are dedicated respectively to the modem and the transceiver. An additional carrier detection interconnection is placed directly between long-range transceiver 306 and transceiver station 301, as shown. Long-range transceiver 306 is provided with an additional antenna 307, appropriate to its particular operating frequencies, different from those of transceiver station 301.

Figure 7:
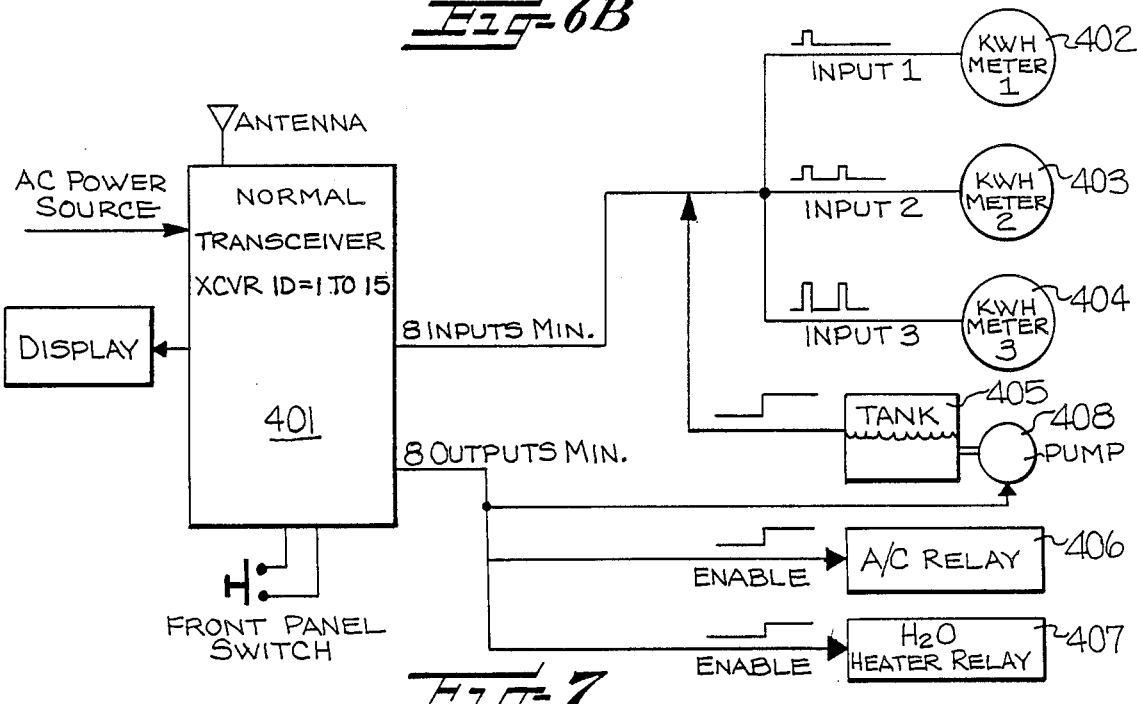
FIG. 7 is a block diagram showing a preferred form of interconnection between a typical transceiver and a utility distribution system.

FIG. 7 shows in block diagram form a transceiver station such as shown in FIG. 5 typically interconnected with the utility distribution system of the home where such station is located. The components and connections within transceiver station 401 are as shown in FIG. 5, and the interconnections therewithin to the power source, display, antenna, and sets of inputs and outputs are likewise as shown in FIG. 5. Here, external connections are shown between the transceiver station inputs and, for example, kilowatt hour meters 402 and 403, another meter 404 which may be a gas meter, for example, and the level detector of a water tank 405 for example. Similarly, external connections are shown between the outputs of transceiver station 401 and pump 40B associated with tank 405, relay 406 which may be associated with an air conditioner, for example, and hot water heater relay 407.

Data as to utility usage accumulated by the meters is delivered to transceiver station 401 inputs and stored in an $E^2PROM$ or RAM, not here shown, from whence it can be accessed by the utility company as explained heretofore. Naturally, additional memory capacity can be added within transceiver station 401, if need be. Likewise, commands either stored in EPROM 103 or received by the receiver portion of transçeiver 401, can be delivered via the outputs of transceiver station 401 to the various appliances involved. Such commands would typically serve to turn such appliances on or off.

It will be recognized that data as to utility usage can be derived by or at the meter in question by any of several ways heretofore known or proposed. For example, given a typical home-type kilowatt hour meter wherein a motor spins a disc at a rate proportional to power usage, one can via reflected light generate a pulse per revolution by recognizing each time the black spot on the disc travels by a preselected location. Likewise, one could also put a hole in the disc and generate via transmitted light a pulse per revolution each time the hole travels by a preselected location. The light generating and detecting means by which such hole or such spot can generate an electrical pulse are well known. Similar arrangements can readily be contemplated in respect of, for example, a gas meter wherein the revolution of a small turbine is proportional to volumetric flow.

Yet another available option for use in connection with the local area network of the invention involves the use of multiple frequencies or radio channels, to avoid problems with interference, interception, or jamming, where exceptionally secure networks are required. The receiver portion of the transceiver can be arranged, using recognizably available technology, to scan for transmissions or, for example, eight preselected frequencies within an available band, uuch as, for example, 300–320 MHz. Likewise, referring again to FIG. 5, the MPU 102 can direct the frequency synthesizer 113 to supply transmission carrier on any of a group of the preselected frequencies within the band which the receivers in the loop are scanning. In conjunction with instructions placed in EPROM 103, MPU 102 can direct that each transmission be on a different frequency. Indeed, the group of preselected frequencies can be changed from time to time, to another group within the band, upon instructions from the local control station.

Still a further option within the contemplation of the invention involves the elimination of both licensed, two-way long distance transceivers and phone lines under circumstances where multiple networks are located in proximity to each other, while still providing means for communications between each network and a central station. This can be accomplished by serially linking each of the local area network control stations in a loop of control stations, one of which is at a central station. Information and instructions would be passed about this loop from control station to control station in precisely the same manner as from station to station in any local area network. Each local control station would need multiple channel capability, with particular channels dedicated to use only in the loop of control stations. Likewise, an identifier would need to be assigned to each control station, based on the network identifier already established. Naturally, the transceiver at the central station would require additional storage capacity and additional instruction generating programming, and would thus be expected to contain a plurality of $E^2PROM$ units, or, alternatively, RAM units with battery back-up.

While the present invention has been described in connection with illustrated embodiments, it will be appreciated and understood that modifications may be made without departing from the true spirit and scope of the invention.

That which is claimed is:

1. A local area network for digital information transmission to and from each of a plurality of building units in an area, wherein all network interconnections between any of said plurality of units and any other of said plurality of units are wireless and employ no cables, said network comprising a plurality of transceiver stations, one each being located at each of said plurality of units, each said transceiver station including:

radio transmitter means adapted to transmit information in digital form, and further adapted to selectively address said transmitted information to at least either of two proximately located other transceiver stations of said plurality, said transmitter means being operable in a frequency range and at a sufficiently low maximum power level as to be normally and lawfully utilizable without an FCC license;

radio receiver means adapted to receive transmissions of information in digital form, and further adapted to specifically recognize such transmissions selectively addressed to said receiver means from at least either two proximately located other transceiver stations of said plurality;

interface means interconnecting said transceiver means with at least one electrical system associated with said unit of said plurality where said transceiver station is located and adapted to accept data from said system and deliver commands to said system;

first means interposed between said interface means and said radio transmitter means and adapted to modulatingly convey said data from said interface means to said radio transmitter means; and second means interposed between said first interface means and said radio receiver means and adapted to demodulatingly convey said commands from said radio receiver means to said interface means;

programmable control means adapted to cause said transmitter means to recognizably and selectively retransmit data and commands received by said receiver means in a predeterminable manner;

whereby said plurality of transceiver stations may be serially linked in a loop; and further whereby commands for any of said systems and data from any of said systems may be passed from station to station about the loop in either of two directions.

2. A local area network as in claim 1, wherein a predetermined one of said plurality of transceiver stations is selected to act as a local control station for the network, said predetermined transceiver station further including means for generating commands addressed to any of the other transceiver stations of said plurality and means for retrievably storing data recognizably received from any of the other transceiver stations of said plurality.

3. A local area network as in claim 1, further comprising means interconnecting a remote control station with any of said transceiver stations of said plurality and adapted to transmit to said remote control station data from any of said plurality of transceiver stations and further adapted to receive from said remote control station commands addressed to any of said plurality of transceiver stations.

4. A local area network as in either of claims 2 or 3 further comprising verification means for periodically assessing the integrity of the network by ascertaining the operability of each transceiver station therein, said verifccation means including means for generating a status command addressed to a first transceiver station among the serially linked plurality of stations in the loop, means within said first station and within each other transceiver station in the network for directing said radio transmitter means therein to address said status command to the next downstream transceiver station in the loop and re-transmit said command thereto, means within said first transceiver station and within each other transceiver station for recognizing when said next downstream station fails to re-transmit said status command, means within said first transceive station and within each other transceiver station for generating a fault signal upon recognizing the failure of said next downstream station to re-transmit said status command, means within said each other transceiver station for directing said radio transmitter means therein to address said fault signal to the next upstream transceiver station in the loop and to transmit said signal thereto, and means within said first transceiver station for directing said fault signal back to said means for generating a status command, and means within said generating means for recognizing, storing, and acting upon said fault signal.

5. A local area network as in claim 4 wherein said means for generating a status command is located within said local control station, and said first transceiver station is said local control station.

6. A local area network as in claim 4 wherein said means for generating a status command is located within said remote central station, and said first transceiver station is said any of said transceiver stations associated with said remote central station via said means interconnecting.

7. A local area security network for wirelessly interconnecting the individual security systems of a plurality of homes in a neighborhood and for transmission in digital form to and from each said home information concerning security system alarm conditions and other information, and network comprising a plurality of transceiver stations, one each being located at each of said plurality of homes, each said transceiver station including:

- radio transmitter means adapted to transmit information in digital form, and further adapted to selectively address said transmitted information to at least either of two proximately located other transceiver stations of said plurality, said transmitter means being operable in a frequency range and at a sufficiently low maximum power level as to be normally and lawfully utilizable without an FCC license;
- radio receiver means adapted to receive transmissions of information in digital form, and further adapted to specifically recognize such transmissions selectively addressed to said receiver means from at least either of two proximately located other transceiver stations of said plurality;
- interface means interconnecting said transceiver means with the individual home security system associated with said home of said plurality where said transceiver station is located and adapted to recognizably accept information concerning alarm conditions from said system and deliver alarm termination commands to said system;
- first means interposed between said interface means and said radio transmitter means and adapted to modulatingly convey said alarm condition information from said interface means to said radio transmitter means;
- second means interposed between said interface means and said radio receiver means and adapted to demodulatingly convey said alarm termination commands from said receiver means to said interface means;
- programmable control means adapted to cause said transmitter means to recognizably and selectively retransmit said alarm condition information and said alarm termination commands received by said receiver means in a predeterminable manner; and
- indicator means adapted to recognizably and selectively indicate the existence of an alarm condition in the security system of any other home of said plurality;
- whereby said plurality of transceiver stations may be serially linked in a loop; and
- whereby alarm condition information and alarm termination commands may be passed from station to station about the loop in either of two directions; and
- further whereby an alarm condition in any security system of said plurality of homes can be selectively and recognizably indicated in at least one other of said plurality of homes.

8. A local area security network as in claim 7, wherein a predetermined one of said plurality of transceiver stations is selected to act as a local control station for the security network, said predetermined transceiver station further including means for generating alarm termination commands addressed to any of the other transceiver stations of said plurality and means for retrievably storing information concerning alarm conditions recognizably received from any of the other transceiver stations of said plurality.

9. A local area security network as in claim 7, further comprising means interconnecting a remote control station with any of said transceiver stations of said plurality and adapted to transmit to said remote control station information concerning said alarm conditions from any of said plurality of transceiver stations and further adapted to receive from said remote control station alarm termination commands addressed to any of said plurality of transceiver stations.

10. A local area security network as in either of claims 8 or 9 furthrr comprising verification means for periodically assessing the integrity of the network by ascertaining the operability of each transceiver station therein, said verification means including means for generating a status command addressed to a first transceiver station among the serially linked plurality of stations in the loop, means within said first station and within each other transceiver station in the network for directing said radio transmitter means therein to address said status command to the next downstream transceiver station in the loop and re-transmit said command thereto, means within said first transceiver station and within each other transceiver station for recognizing when said next downstream station fails to re-transmit said status command, means within said first transceiver station and within each other transceiver station for generating a fault signal upon recognizing the failure of said next downstream station to re-transmit said status command, means within said each other transceiver station for directing said radio transmitter means therein to address said fault signal to the next upstream transceiver station in the loop and to transmit said signal thereto, and means within said first transceiver station for directing said fault signal back to said means for generating a status command, and means within said generating means for recognizing, storing, and acting upon said fault signal.

11. A local area security network as in claim 10 wherein said means for generating a status command is located within said local control station, and said first transceiver station is said local control station.

12. A lccal area security network as in claim 10 wherein said means for generating a status command is located within said remote control station via said means interconnecting.

13. A local area utility service network for wirelessly interconnecting the individual utility distribution systems of a plurality of homes in a neighborhood and for transmission in digital form to and from each said home information concerning utility usage and other information, said network comprising a plurality of transceiver stations, one each being located at each of said plurality of homes, each said transceiver station including:

- ratio transmitter means adapted to transmit information in digital form, and further adapted to selectively address said transmitted information to at least either of two proximately located other transceiver stations of said plurality, said transmitter means being operable in a frequency range and at a sufficiently low maximum power level as to be normally and lawfully utilizable without an FCC license;
- radio receiver means adapted to receive transmissions of information in digital form, and further adapted to specifically recognize such transmissions selectively addressed to said receiver means from at least either of two proximately located other transceiver stations of said plurality;
- interface means nnterconnecting said transceiver means with at least one utility distribution system associated with said home of said plurality where said transceiver station is located and adapted to recognizably accept information concerning utility usage from said system and deliver appliance enabling and disenabling commands to said system;

first means interposed between said interface means and said radio transmitter means and adapted to modulatingly convey said utility usage information from said interface means to said transmitter means;

second means interposed between said interface means and said radio receiver means and adapted to demodulatingly convey said appliance enabling and disenabling commands from said receiver means to said interface means; and programmable control means adapted to cause said transmitter means to recognizable and selectively retransmit said utility usage information and said appliance enabling and disenabling commands received by said receiver means in a predetermined manner;

whereby said plurality of transceiver stations may be serially linked in a loop; and whereby utility usage information and appliance enabling and disenabling commands may be passed from station to station about the loop in either of two directions.

14. A local area utility service network as in claim 13, wherein a predetermined one of said plurality of transceiver stations is selected to act as a local control station for the network, said predetermined transceiver station further including means for generating appliance enabling and disenabling commands addressed to any of the other transceiver stations of said plurality and means for retrievably storing information regarding utility usage recognizably received from any of the other transceiver stations of said plurality.

15. A local area network as in claim 13, further comprising means interconnecting a remote control station with any of said transceiver stations of said plurality and adapted to transmit to said remote control station information regarding utility usage from any of said plurality of transceiver stations and further adapted to receive from said remote control station commands addressed to any of said plurality of transceiver stations.

16. A local area network as in either of claims 14 or 15 further comprising verification means for periodically assessing the integrity of the utility service network by ascertaining the operability of each transceiver station therein, said verification means including means for generating a status command addressed to a frrst transceiver station among the serially linked plurality of stations in the loop, means within said first station and within each other transceiver station in the network for directing said radio transmitter means therein to address said status command to the next downstream transceiver station in the loop and re-transmit said command thereto, means within said first transceiver station and within each other transceiver station for recognizing when said next downstream station fails to re-transmit said status command, means within said first transceiver station and within each other transceiver station for generating a fault signal upon recognizing the failure of said next downstream station to re-transmit said status command, means within said each other transceiver station for directing said radio transmitter means therein to address said fault signal to the next upstream transceiver station in the loop and to transmit said signal thereto, and means within said first transceiver station for directing said fault signal back to said means for generating a status command, and means within said generating means for recognizing, storing, and acting upon said fault signal.

17. A local area security network as in claim 16 wherein said means for generating a status command is located within said local control station, and said first transceiver station is said local control station.

18. A local area security network as in claim 16 wherein said means for generating a status command is located within said remote control station via said means interconnecting.

19. A local area network as in any of claims 3, 9 or 15, wherein said means interconnecting a remote control station with any of said transceiver stations of said plurality of further comprises a higher power, licensed, two-way radio transceiver of a predetermined frequency range and mode of modulation operatively associated with said any of said transceiver stations of said plurality.

20. A local area network as in any of claims 3, 9 or 15, wherein said means interconnecting a remote control station with any of said transceiver stations of said plurality further comprises a modem interconnected between said any of said transceiver stations of said plurality of and a telephone line associated with the building unit at which said any of said transceiver stations is located.

21. A local area network as in any of claims 3, 9 or 15, wherein said means interconnecting a remote control station with said any of said transceiver stations of said plurality of further comprises a plurality of modems, one each interconnected between each said transceiver station of said plurality of and the telephone line associated with the building unit where said transceiver station is located, and wherein said programmable control means included within said any of said transceiver stations is further adapted to transmittably and selectively command the utilization of any of said plurality of modems as said means interconnecting.

22. A local area network as in any of claims 1, 7 or 13, wherein said receiver means further comprises means for scanning a preselected set of frequencies, said transmitter means further comprises means for transmitting on any of said set of preselected frequencies, and said programmable control means is further adapted to determine the one frequency of said preselected set of frequencies at which said transmitter means may transmit at any given point in time.

23. A local area network as in any of claims 2, 8 or 14, wherein said transceiver station selected to act as a local control station further comprises second transmitter means and second receiver means adapted to transmit and receive signals of at least one second frequency other than that utilized by said network, and further programmable control means adapted to cause said second transmitter means and said second receiver means to respectively transmit, receive and retransmit data and commands at said second frequency, whereby the local control stations of a plurality of adjacent locl area networks may be serially linked in a loop.

* * * * *

UNITED STATES PATENT AND TRADEMARK OFFICE
CERTIFICATE OF CORRECTION

PATENT NO. : 4,792,946

DATED : December 20, 1988

INVENTOR(S) : Scott T. Mayo

It is certified that error appears in the above-identified patent and that said Letters Patent is hereby corrected as shown below:

```
In the Abstract, line 5, "and" should be -- an --.
Column 1, line 56, "arge" should be -- large --.
Column 2, line 47, "proximitely" should be -- proximately --;
          line 66, "recognizally" should be -- recognizably --.
Column 5, line 33, "menns" should be -- means --;
          line 34, before "typical" insert -- a --.
Column 6, line 26, "beteeen" should be -- between --;
          line 53, "transmttted" should be -- transmitted --.
Column 7, line 63, "oontrol" should be -- control --.
Column 8, line 19, "utllity" should be -- utility --.
Column 9, line 43, "stations" should be -- station --.
Column 10, line 4, "cnntrol" should be -- control --;
           line 5, "amlle" should be -- ample --.
Column 11, line 2, "lO2" should be -- 102 --;
           line 7, "IOI" should be -- 101 --;
           line 23, "Swttch" should be -- Switch --;
           line 24, "A" should be -- As --;
           line 26, "aall" should be -- all --;
           line 31, "I08" should be -- 108 --.
Column 12, line 3, "I02" should be -- 102 --.
           line 36, "commadd" should be -- command --;
           line 45, "I02" (both occurrences) should be -- 102 --;
           line 63, "whihh" should be -- which --.
Column 13, line 16, "I02" should be -- 102 --;
           line 29, "frr" should be -- for --;
           line 40, "toaa" should be -- to a --;
           line 46, "locll" should be -- local --;
           line 49, "nnstructions" should be -- instructions --.
Column 14, line 56, "uuch" should be -- such --.
Column 15, line 3, "wiile" should be -- while --.
```

UNITED STATES PATENT AND TRADEMARK OFFICE
CERTIFICATE OF CORRECTION

PATENT NO. : 4,792,946

DATED : December 20, 1988

INVENTOR(S) : Scott T. Mayo

It is certified that error appears in the above-identified patent and that said Letters Patent is hereby corrected as shown below:

Column 16, line 28, "verifccation" should be -- verification --;
          line 39, "transceive" should be -- transceiver --;
          line 67, "and" should be -- said --.
Column 18, line 37, "lccal" should be -- local --.
Column 19, line 14, "recognizable" should be -- recognizably --;
          line 48, "frrst" should be -- first --.
Column 20, line 18, omit "of";
          line 28, omit "of";
          line 34, omit "of" (first occurrence);
          line 36, omit "of" (second occurrence);
          line 62, "locl" should be -- local --.

Signed and Sealed this

Twentieth Day of June, 1989

Attest:

DONALD J. QUIGG

Attesting Officer      Commissioner of Patents and Trademarks